United States Patent
Huang et al.

(10) Patent No.: US 9,723,525 B2
(45) Date of Patent: Aug. 1, 2017

(54) METHOD AND DEVICE FOR CALIBRATING MOBILE ROBUSTNESS OPTIMIZATION FUNCTION

(71) Applicant: Telefonaktiebolaget L M Ericsson (publ), Stockholm (SE)

(72) Inventors: Min Huang, Beijing (CN); Xiaodong Yang, Nanjing (CN); Lei Xiao, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 113 days.

(21) Appl. No.: 14/439,872

(22) PCT Filed: Oct. 9, 2012

(86) PCT No.: PCT/CN2012/082618
§ 371 (c)(1),
(2) Date: Apr. 30, 2015

(87) PCT Pub. No.: WO2014/056142
PCT Pub. Date: Apr. 17, 2014

(65) Prior Publication Data
US 2015/0271719 A1   Sep. 24, 2015

(51) Int. Cl.
*H04W 36/00* (2009.01)
*H04W 36/04* (2009.01)
*H04W 84/04* (2009.01)

(52) U.S. Cl.
CPC ........ *H04W 36/0094* (2013.01); *H04W 36/04* (2013.01); *H04W 84/045* (2013.01)

(58) Field of Classification Search
None
See application file for complete search history.

(56) References Cited

U.S. PATENT DOCUMENTS

| 2008/0081624 | A1 | 4/2008 | Reial et al. | |
| 2011/0117908 | A1* | 5/2011 | Huang | H04W 76/028 455/423 |
| 2012/0276900 | A1* | 11/2012 | Stephens | H04W 24/02 455/436 |

FOREIGN PATENT DOCUMENTS

| CN | 101990779 | 3/2011 |
| CN | 102119186 | 8/2011 |
| WO | WO 2012/083675 | 6/2012 |

OTHER PUBLICATIONS

PCT Notification of Transmittal of the International Search Report and the Written Opinion of the International Searching Authority, or the Declaration for International application No. PCT/CN2012/082618, Jul. 18, 2013.

(Continued)

*Primary Examiner* — Mohammad Adhami
(74) *Attorney, Agent, or Firm* — Patents on Demand P.A.; Brian K. Buchheit; Scott M. Garrett

(57) ABSTRACT

One of the embodiments of the present invention relates to a method for calibrating mobile robustness optimization function for inter-cell handover. The method comprises detecting mobile robustness optimization deviation; calibrating said mobile robustness optimization function by—compensating the detected mobile robustness optimization deviation. The embodiments of the present invention further provide corresponding apparatuses and base stations.

12 Claims, 7 Drawing Sheets

(56) References Cited

OTHER PUBLICATIONS

3GPP TS 36.300 V10.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 10), Dec. 2011.
3GPP TS 36.331 V10.4.0; 3rd Generation Partnership Project; Technical Specification Group Radio Access Network; Evolved Universal Terrestrial Radio Access (E-UTRA); Radio Resource Control (RRC); Protocol specification (Release 10), Dec. 2011.
3GPP TR 36.902 V9.3.1; 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), Mar. 2011.

\* cited by examiner

METHOD AND DEVICE FOR CALIBRATING MOBILE ROBUSTNESS OPTIMIZATION FUNCTION

PRIORITY

This nonprovisional application is a U.S. National Stage Filing under 35 U.S.C. §371 of International Patent Application Serial No. PCT/CN2012/082618, filed Oct. 9, 2012, and entitled "METHOD AND DEVICE FOR CALIBRATING MOBILE ROBUSTNESS OPTIMIZATION FUNCTION."

TECHNICAL FIELD

The embodiments of the present invention generally relate to wireless communication, particularly to a method and device for calibrating mobile robustness optimization function for inter-cell handover.

DESCRIPTION OF THE RELATED ART

In Long Term Evolution (LTE) specification, mobility robustness optimization (MRO) is introduced to provide an approach to optimize handover parameters in cellular network, with the target to improve the handover performance. The third Generation Partnership Project (3GPP) specification TS36.300 v10.6.0 and 3GPP specification TS36.902 v9.3.1 as examples of relevant LTE standards are incorporated by reference herein in their entirety. For a connected-mode, by adjusting the handover parameter such as an offset parameter indicative of a border of a cell-relation, the border of a cell-relation can be moved adaptively. The triggering of such kind of auto-adjustment is the statistics of some pre-defined events in every evaluation period, including events of too-early handover, too-late handover, handover to wrong cell, whose definition can be found in Section 22.4.2.2 of 3GPP specification TS36.300 v10.6.0.

In scenarios when MRO works correctly, for the concerned neighbor cell relation, the detected handover failures are classified as these pre-defined events and counted in evaluation periods. In the end of each evaluation period, these counts are calculated and evaluated. If some given criteria are satisfied, the adjustment of the handover parameter is decided. Such adjustment of the handover parameter can apply a fixed step for an enumerated set or variable-length step, which may increase or decrease the specific handover parameter. By doing so, it is expected that the handover parameter could finally achieve the balance point where the handover performance is the best, and could be updated real time with the radio channel and network deployment variation.

FIG. 1 shows an illustration about the relation between MRO function and handover failure ratio. The MRO function would adjust the handover parameter such as the offset indicative of a border of a cell-relation, based on the statistics of "too-early handover (HO)" and "too-late HO" events. In the example of FIG. 1, the offset parameter can be, for example, an cell individual offset (CIO) or handover margin (HOM), wherein CIO is normally defined as the difference between the additive factor at neighbor cell and the additive factor at serving cell, while HOM is normally defined as the difference between the additive factor at serving cell and the additive factor at neighbor cell, which equals the minus value of CIO.

With the increase of HOM value (i.e., the decrease of CIO value), the probability of too-early handover event would decrease, and on the contrary, the probability of too-late HO event would increase. And with the increase of HOM value, the curve of handover failure ratio would first decrease and then increase.

Since the MRO function is based on the real-time statistics in each limited-length evaluation period (e.g., 1 hour), there exists some chance that the counts of monitored events are not fixed. As shown in FIG. 1, the possible counts of too-early handover events and too-late handover events are within the scopes between two dashed curves, although their mean values follow the solid curve. Then, the possible offset parameter value (e.g., HOM/CIO values) lies in a scope between the two outmost intersections of the dashed curves, and the trace of the offset parameter value fluctuates around a center JO corresponding to the intersection of the two solid curves. This phenomenon can be referred as to "offset fluctuation".

The object of MRO is to optimize the handover setting so that the handover performance, such as the smallest handover failure ratio, can be achieved. Therefore, when MRO function is set correctly, the bottom point of handover failure ratio curve should correspond to the intersection of "too-early HO" curve and "too-late HO" curve. Only in this way, the handover failure ratio can be minimized in offset fluctuation.

However, partially because the initial parameter configuration or the used detection method may not good enough, and partially because that the radio channel and network deployment vary greatly, especially in heterogeneous network (such as pico cell, femto cell, relay cell), some errors or out-date in MRO functionality are turned out, and hence the handover parameter generated by MRO may exist a certain deviation to the optimal one, here referred as to "MRO deviation". In theses cases, MRO is possibly not able to provide enhancement to the handover performance, or even take negative effects, such as increasing handover failure ratio.

Therefore, it is desired to provide a solution for the calibrating MRO for inter-cell handover.

SUMMARY OF THE INVENTION

To solve the problems in the prior art, one or more method and apparatus embodiments according to the present invention aim to provide a solution for the calibrating mobile robustness optimization function for inter-cell handover.

According to an aspect of the present invention, an embodiment of the present invention provides a method for calibrating mobile robustness optimization function for inter-cell handover. The method comprises: detecting mobile robustness optimization deviation; calibrating the mobile robustness optimization function by compensating the detected mobile robustness optimization deviation. In an embodiment of the present invention, the mobile robustness optimization deviation can be detected by comparing a fluctuation center of an offset parameter indicative of a border of a cell-relation and a value of the offset parameter enabling handover failure ratio to be minimized.

According to an aspect of the present invention, an embodiment of the present invention provides a method for calibrating mobile robustness optimization function for inter-cell handover. The method comprises: receiving from a source base station of handover a message indicative of reasons of mobile robustness optimization deviation; and calibrating the mobile robustness optimization function by adjusting a timing threshold for storing user equipment context based on the received reasons of mobile robustness optimization deviation. In an embodiment of the present invention, the mobile robustness optimization deviation is detected by the source base station by comparing a fluctuation center of an offset parameter indicative of a border of a cell-relation and a value of the offset parameter enabling handover failure ratio to be minimized.

According to an aspect of the present invention, an embodiment of the present invention provides an apparatus for calibrating mobile robustness optimization function for inter-cell handover. The apparatus comprises: detecting unit configured to detect mobile robustness optimization deviation; calibrating unit configured to calibrate said mobile robustness optimization function by compensating the detected mobile robustness optimization deviation. In an embodiment of the present invention, the detecting unit can compare a fluctuation center of an offset parameter indicative of a border of a cell-relation and a value of the offset parameter enabling handover failure ratio to be minimized, so as to detect the mobile robustness optimization deviation.

According to an aspect of the present invention, an embodiment of the present invention provides an apparatus for calibrating mobile robustness optimization function for inter-cell handover. The apparatus comprises: receiving unit configured to receive from a source base station of handover a message indicative of reasons of mobile robustness optimization deviation; and calibrating unit configured to calibrate the mobile robustness optimization function by adjusting a timing threshold for storing user equipment context based on the received reasons of mobile robustness optimization deviation. In an embodiment of the present invention, the mobile robustness optimization deviation is detected by the source base station by comparing a fluctuation center of an offset parameter indicative of a border of a cell-relation and a value of the offset parameter enabling handover failure ratio to be minimized.

According to an aspect of the present invention, an embodiment of the present invention provides abase station. The base station comprises an apparatus for calibrating mobile robustness optimization function for inter-cell handover according to the various embodiments of the present invention.

According to one or more embodiments of the present invention, the mobile robustness optimization deviation can be detected in real time and compensated automatically, and therefore the inaccuracy and out-date for manual configuration can be avoided.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. For example, the embodiments of the present invention are not limited to be implemented in a heterogeneous network or a homogeneous network. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 2A:
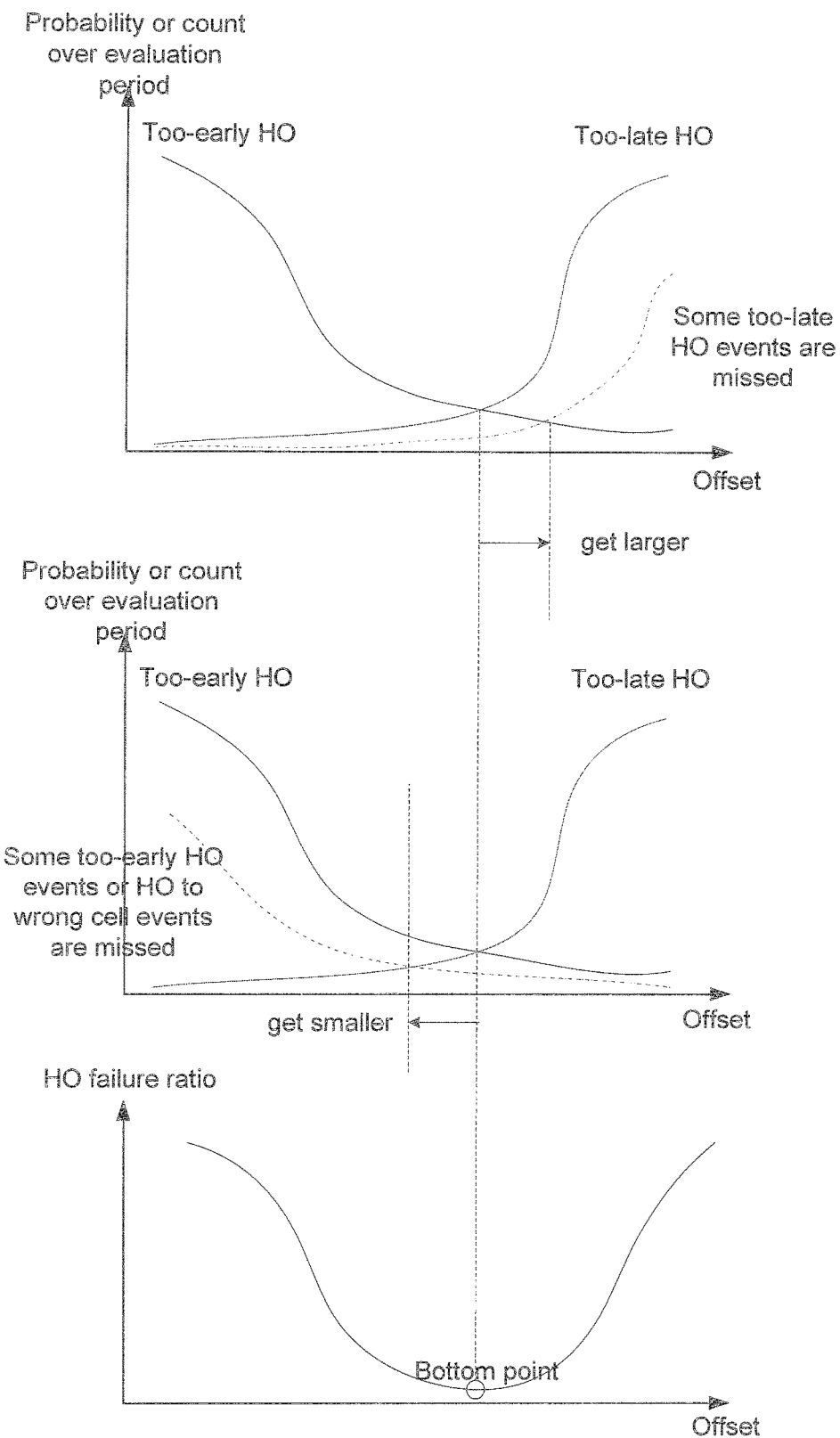
FIGS. 2A and 2B schematically illustrate MRO deviations emerged in MRO parameter configuration or algorithm application.
Figure 2B:
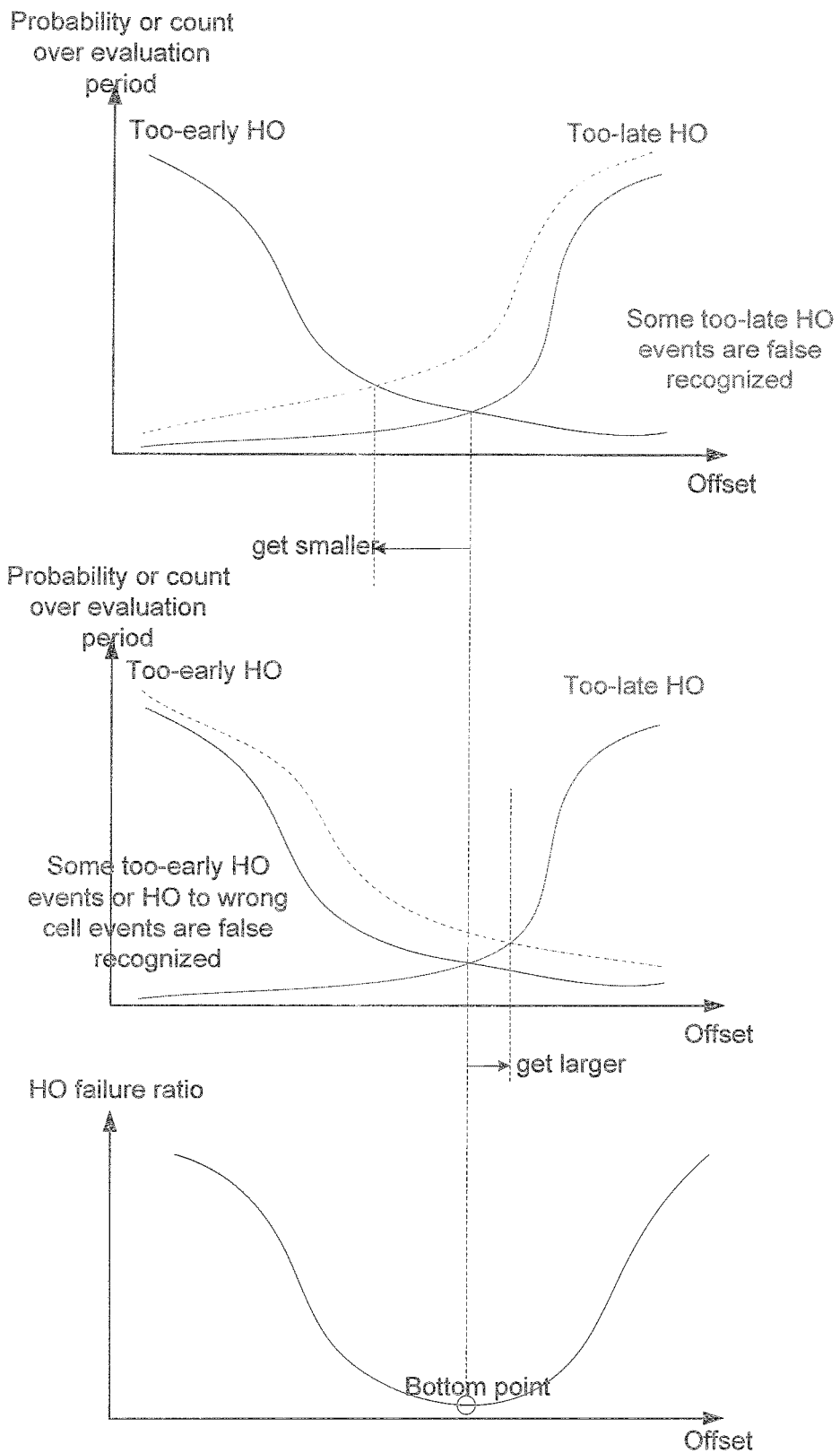

Although MRO function is introduced to optimize the handover setting so as to enhance the handover performance, some possible deviations might emerge in MRO parameter configuration or algorithm application, which would lead to worse handover performance. FIGS. 2A and 2B schematically illustrate possible MRO deviations in different circumstances.

In one circumstance, missing "too-late HO" event or "too-early HO" event in statistics may lead to undesired MRO deviations.

As shown in FIG. 2A, if some "too-late HO" events are missed, e.g. because the timing threshold (denoted as $T_{too\_late\_detect}$), at a source base station of handover, for judging whether a "too-late HO" event is detected is configured too small, the curve of too-late HO count vs. Offset would get lower (represented by dashed-dot line), resulting in the intersection of the mean value of "too-early HO" curve and the mean value of "too-late HO" curve (in the following context, this is called as the Intersection) being shifted to right, and hence the offset fluctuation center gets larger.

On the contrary, if some "too-early HO" events are missed, e.g. because the timing threshold (denoted as $T_{too\_early\_detect}$), at a source base station of handover, for judging whether a "too-early HO" event is detected or the timing threshold (denoted as $T_{store\_ue\_cntxt}$), at a target base station, for storing user equipment context is configured too small, the curve of too-early HO count vs. Offset would get lower (represented by dashed-dot line), resulting in the Intersection being shifted to left, and hence the offset fluctuation center gets smaller.

In another circumstance, false recognizing "too-late HO" event or "too-early HO" event in statistics may also lead to undesired MRO deviations.

As shown in FIG. 2B, if some "too-late HO" events are false recognized, e.g. because the timing threshold $T_{too\_late\_detect}$ at a source base station is configured too large, the curve of too-late HO count vs. Offset would get higher (represented by dashed-dot line), resulting in the Intersection being shifted to left, and hence the offset fluctuation center gets smaller.

On the contrary, if some too-early HO events are false recognized, e.g. because the timing threshold $T_{too\_early\_detect}$ at a source base station or the timing threshold $T_{store\_ue\_cntxt}$ at a target base station is configured too large, the curve of too-early HO count vs. Offset would get higher (represented by dashed-dot line), resulting in the Intersection being shifted to right, and hence the offset fluctuation center gets larger.

In the above-identified circumstances of MRO deviations, the offset fluctuation center is deviated, but the HO failure ratio curve is remained. This makes the offset fluctuation center no longer correspond to the bottom point of HO failure ratio curve, and hence more HO failure cases would happen.

The embodiments of the present invention provide a mechanism for calibrating MRO function for inter-cell handover so as to compensate MRO deviation when it appears and therefore avoid handover performance deterioration.

Figure 3:
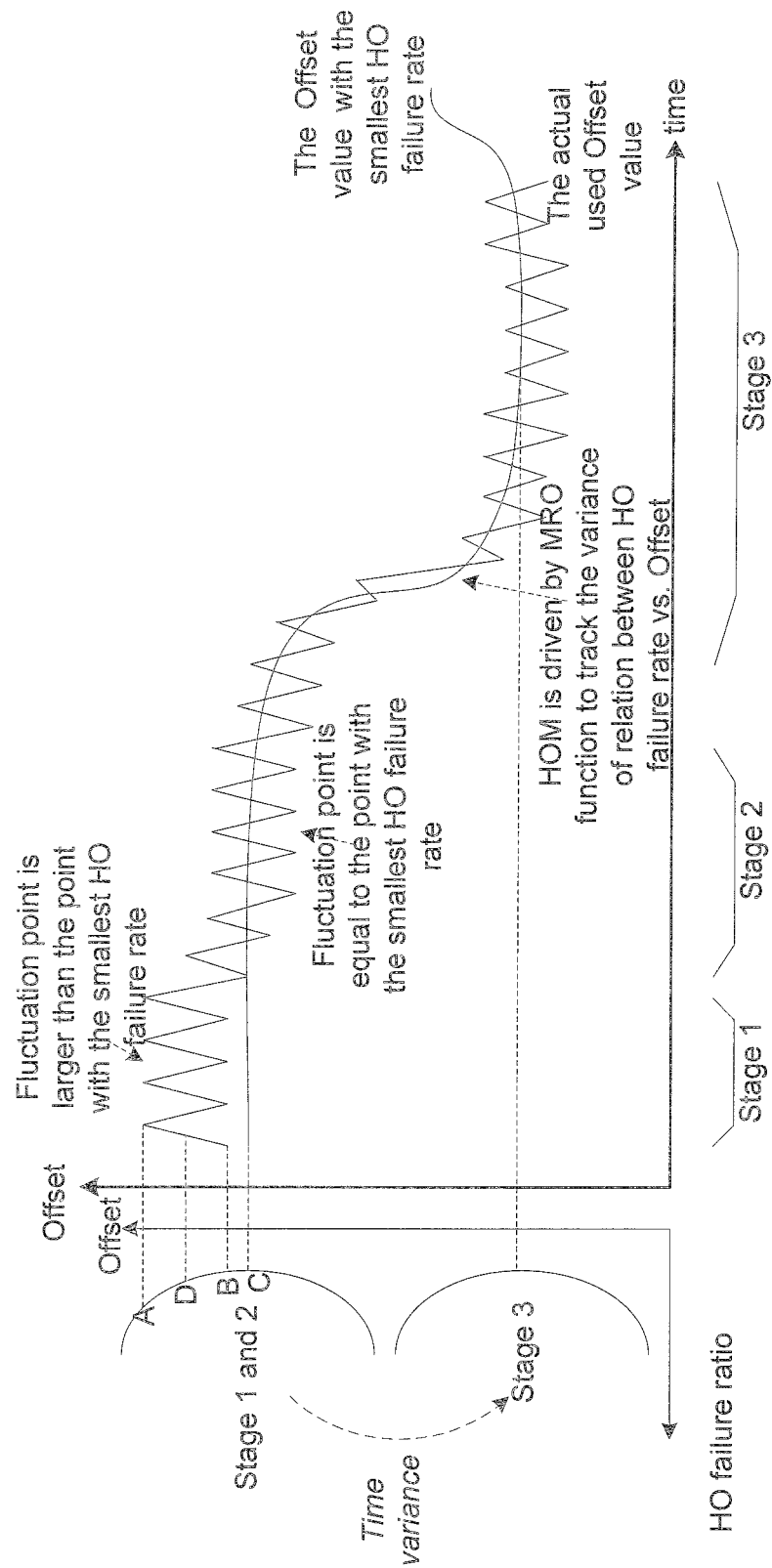
FIG. 3 schematically illustrates the relation between MRO function and handover failure ratio with MRO deviation being calibrated according to embodiments of the present invention.

FIG. 3 schematically illustrates the relation between MRO function and handover failure ratio with MRO deviation being calibrated according to embodiments of the present invention. With reference to FIG. 3, the basic principle of embodiments of the present invention will be set forth by a way of example.

The optimal handover parameter such the offset parameter indicative of a border of a cell-relation depends on the network deployment and radio propagation environment. In practice, the network deployment might be changed according to different service requirement, in a static and burst pace for the fixed network infrastructure or in a dynamic and continual pace for the moving network infrastructure. On the other hand, the radio propagation environment might also vary in real time, especially in the dense urban area. All these factors contribute to the variance of the optimal handover parameter which should lead to the best handover performance. It can be expected that the value of the offset parameter with the smallest handover failure ratio would vary with time.

When MRO function works correctly, the actual used value of the offset parameter, driven by MRO functionality, would fluctuate around the point with the smallest handover failure ratio as previously discussed. This is essentially a dynamic balance process, which enables the configuration of the offset parameter to track the variance of network deployment and radio propagation environment.

However, the suitable MRO function is also influenced by the real-time network scenarios. For example, if the interference situation becomes serious and the Random Access Channel (RACH) resource becomes more competitive, the RRC Connection Re-establishment procedure, which is a key step in MRO function, would consume more latency, and thus the event detection criteria applied in MRO function becomes relatively over-strict, and some events might be missed as shown in FIG. 2A. On the contrary, when the radio situation turns better, the event detection criteria applied in MRO function becomes relatively under-strict, and some events might be false recognized as shown in FIG. 2B.

When MRO function works incorrectly, including missing some events or false recognizing some events, the actual used value of the offset parameter would fluctuate around a point higher or lower than the point with the smallest handover failure ratio. In this regard, as shown in FIG. 3, in stage 1, it can be observed that the fluctuation center (Point D) does not correspond to the point with the global smallest handover failure ratio (Point C), neither correspond to the point with the regional smallest handover failure ratio among all the observable values of the offset parameter (the segment between Point A and Point B). It is intended to detect this mismatch, i.e., MRO deviation, so that the fluctuation center of the offset parameter could tend to the point with the smallest handover failure ratio, as shown in stage 2.

In the time period including stage 1 and stage 2, it is assumed that the relation between handover failure ratio and the offset parameter is constant and can be obtained, and then the MRO function including parameters and algorithms are calibrated by this relation. Once the MRO function works correctly, it has the capability to track the variation of relation between the handover failure ratio and the offset parameter, as shown in stage 3.

On one hand, in a short time dimension, for example, in stage 1, the relation of handover failure ratio vs. Offset parameter is approximately constant, and hence the potential MRO deviation, either caused by the initial configuration or the network scenario variation, can be calibrated by comparison between the fluctuation center (point D) of the offset parameter and the value (point B) of the offset parameter enabling the handover failure ratio to be minimized.

On the other hand, in a long time dimension, for example, from stage 2 to stage 3, the calibrated MRO function can capture the variation of the relation of handover failure ratio vs. Offset parameter. This provides automatic optimization to handover parameters in the change of cell deployment and radio propagation environment.

If the relation of handover failure ratio vs. Offset parameter changes before the MRO deviation is corrected completely (not shown in FIG. 3), the MRO function would still drive the offset parameter to follow the trend of relation, though with a certain deviation. Then, after the change of relation pauses, the correction of MRO deviation can be continued until the MRO function is fully calibrated.

Now, various embodiments of the present invention will be described in details in conjunction with FIGS. 4-6.

Figure 4:
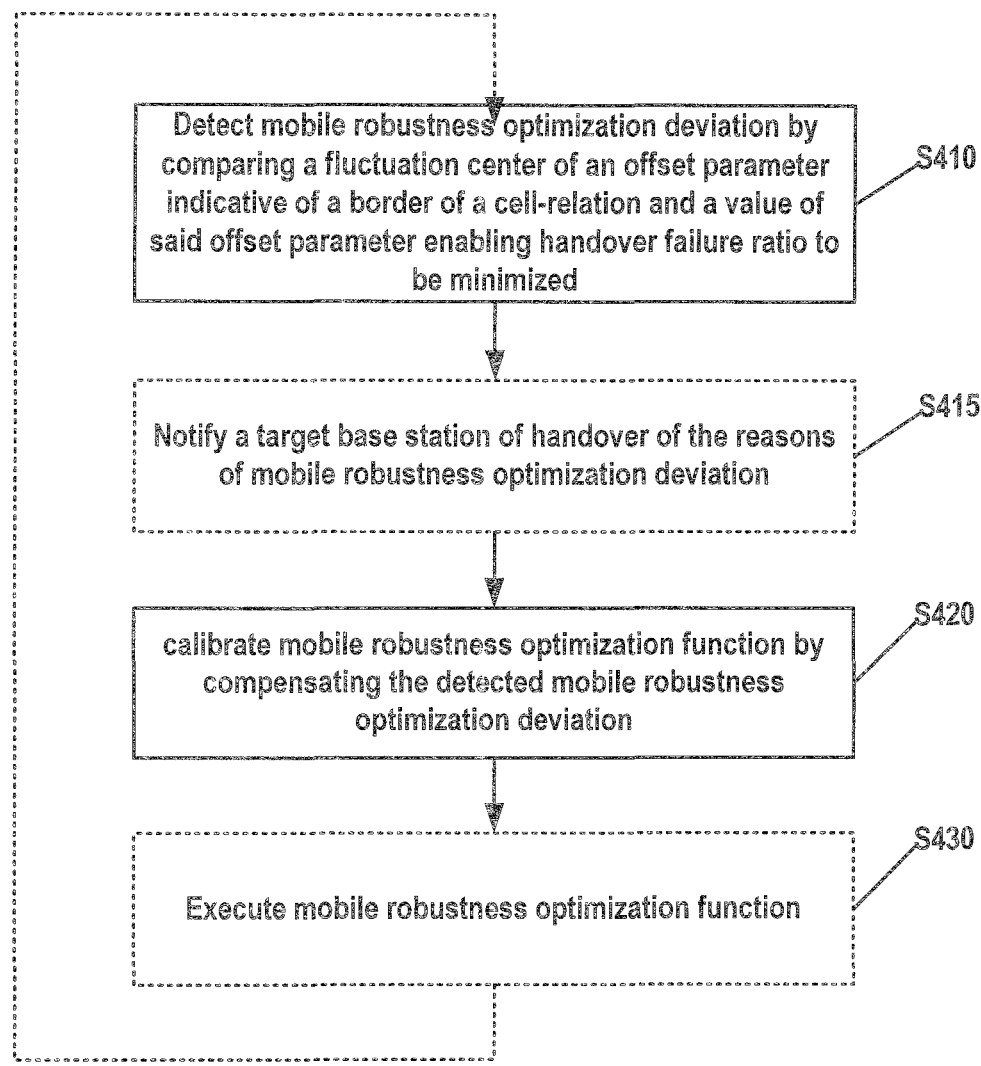
FIG. 4 schematically illustrates an exemplary flow chart of a method for calibrating mobile robustness optimization function for inter-cell handover according to an embodiment of the present invention.

FIG. 4 schematically illustrates a flow chart of a method for calibrating MRO function for inter-cell handover according to an embodiment of the present invention.

Referring to FIG. 4, in step S410, MRO deviation is detected at a source base station of handover by comparing a fluctuation center of an offset parameter indicative of a border of a cell-relation and a value of the offset parameter enabling handover failure ratio to be minimized.

According to an embodiment of the present invention, the source base station may calculate the fluctuation center of the offset parameter, for example, the HOM fluctuation center, in real time by monitoring an actual usage trace of the offset parameter. In an implementation, the fluctuation center can be calculated by applying the mean value of a sliding window with a predefined length.

It should be appreciated that the offset parameter can be, for example, CIO or HOM, wherein CIO is normally defined as the difference between the additive factor at neighbor cell and the additive factor at serving cell, while HOM is normally defined as the difference between the additive factor at serving cell and the additive factor at neighbor cell. Although HOM or -CIO is taken as an example herein to illustrate one or more embodiments of the present invention without any loss of generality, those skilled in the art may appreciate that in some other embodiments of the present invention, any other suitable parameter, which is indicative of a border of a cell-relation for inter-cell handover, can also be employed to meet specific practical requirements.

According to an embodiment of the present invention, the source base station may determine the value of the offset parameter, for example, the HOM value, enabling the handover failure ratio to be minimized by counting the handover failure ratio at each enumerated HOM value. In an exemplary implementation, for every enumerated HOM value, e.g., −20 dB to +20 dB with step 1 dB, a counter may be maintained which records the handover failure ratio when HOM equals this value. It can be appreciated that determining the HOM with the smallest handover failure ratio would not introduce much additional complexity, which only requires to link the handover failure ratio to the HOM values in each evaluation period, as counting the handover failure ratio is one of systematic performance management metrics. If the cell deployment and radio propagation environment are not changed, the handover failure ratio at each HOM value will be kept constant. Therefore, the HOM value with the smallest handover failure rate is fixed. By tracking the HOM value fluctuation, the handover failure ratios for those experienced HOM values can be obtained and updated.

According to an embodiment of the present invention, in order to detect MRO deviation, the source base station may deduce reasons of the MRO deviation based on whether the HUM fluctuation center is smaller or larger than the HOM value enabling the handover failure ratio to be minimized.

In an implementation of the present invention, the comparison operation can apply some specific criteria, for example:

periodically: a repetitive fixed-length period can be predefined and the comparison is taken place at the end of each period;

threshold-based: a threshold can be predefined in terms of the comparison distance. Only when the difference amplitude between the HOM fluctuation center and the HOM value with the smallest handover failure rate exceeds the predefined threshold, in direction of either positive or negative, the detected deviation can be admitted. In this way, inaccuracy of the monitoring and counting operations are taken into account, avoiding false-alarm results.

If the HOM fluctuation center is smaller than the determined HOM value enabling said handover failure ratio to be minimized, it can be deduced that the reasons of the MRO deviation comprise any of missing too-early handover events, missing handover to wrong cell events, or false recognizing too-late handover events.

If the HOM fluctuation center is larger than the determined HOM value enabling said handover failure ratio to be minimized, it can be deduced that the reasons of the MRO deviation comprise any of missing too-late handover events, false recognizing too-early handover events, or false recognizing handover to wrong cell events.

It should note that it is possible that whole curve of handover failure ratio vs. HOM cannot be obtained when the comparison is performed. For example, if only a segment of curve of handover failure ratio vs. HOM is obtained, and this segment does not contain the point with the global smallest handover failure ratio, then the fluctuation center and the HOM value with the observed (regional) smallest HO failure rate still exist a certain deviation, by which the corresponding MRO deviation can be detected.

At step S420, the MRO function is calibrated by compensating the detected MRO deviation. Specifically, MRO parameters and/or MRO algorithms can be adjusted according to the deduced reasons of the MRO deviation.

In the embodiments of the present invention where the MRO parameters are adjusted, the source base station may choose 1) to adjust its own MRO parameters trying to eliminate the MRO deviation; and/or 2) to notify (S415) a target base station of handover of the deduced reasons of the MRO deviation so that the target base station could take actions to compensate its MRO function. The additional or alternative processing performed in the target base station is illustrated in FIG. 5 and will be discussed hereafter.

According to an embodiment of the present invention, if the deduced reasons of the MRO deviation is any of missing too-early handover events, missing handover to wrong cell events, or false recognizing too-late handover events, then the source base station may increase the timing threshold $T_{too\_early\_detect}$, which is between connection failure occurring shortly after a successful handover from a source cell to a target cell or during a handover and user equipment attempting to re-establish the radio link connection in the source cell, for judging whether a too-early handover event is detected, and/or decreasing the timing threshold $T_{too\_late\_detect}$, which is between connection failure occurring in said source cell before the handover was initiated or during a handover and UE attempting to re-establish the radio link connection in said target cell or in a cell that is not said source cell, for judging whether a too-late handover event is detected.

Alternatively or additionally, in the condition that the deduced reasons of the MRO deviation is any of missing too-early handover events, missing handover to wrong cell events, or false recognizing too-late handover events, the source base station may choose to notify (S415) the target base station of handover of the reasons of the MRO deviation so as to cause said target base station of handover to increase the timing threshold $T_{store\_ue\_cntxt}$ for storing user equipment context. In an implementation of the present invention, the source base station may send to the target base station of handover a message indicative of the deduced reasons of the MRO deviation according to LTE X2 Application Protocol.

Figure 5:
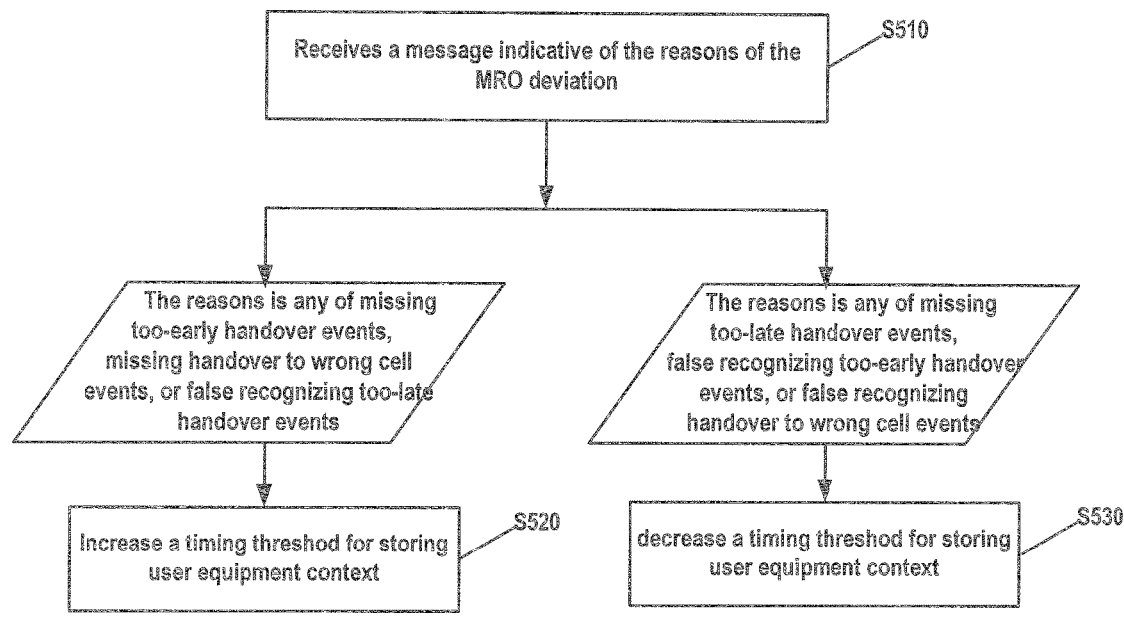
FIG. 5 schematically illustrates an exemplary flow chart of a processing performed in a target base station of handover according to an embodiment of the present invention.

FIG. 5 illustrates an exemplary flow chart of an additional or alternative processing performed in a target base station of handover according to an embodiment of the present invention.

As shown in FIG. 5, in step S510, the target base station receives a message indicative of the deduced reasons of the MRO deviation notified by the source base station. In response to the received reasons of the MRO deviation being any of missing too-early handover events, missing handover to wrong cell events, or false recognizing too-late handover events, in step S520, the target base station may increase the timing threshold $T_{store\_ue\_cntxt}$ for storing user equipment context so as to compensate at least part of the determined MRO deviation.

Returning to FIG. 4, in step S420, according to an embodiment of the present invention, if the deduced reasons of the MRO deviation is any of missing too-late handover events, false recognizing too-early handover events, or false recognizing handover to wrong cell events, the source base station may decrease the timing threshold $T_{too\_early\_detect}$ for judging whether a too-early handover event is detected and/or increasing the timing threshold $T_{too\_late\_detect}$ for judging whether a too-late handover event is detected.

Alternatively or additionally, in the condition that the deduced reasons of the MRO deviation is any of missing too-late handover events, false recognizing too-early handover events, or false recognizing handover to wrong cell events, the source base station may choose to notify (S415) the target base station of handover of the reasons of the MRO deviation so as to cause the target base station of handover to decrease the timing threshold $T_{store\_ue\_cntxt}$ for storing user equipment context. In an implementation of the present invention, the source base station may send to the target base station of handover a message indicative of the deduced reasons of the MRO deviation according to LTE X2 Application Protocol.

Referring to FIG. 5 again, in step S510, the target base station receives a message indicative of the deduced reasons of the MRO deviation notified by the source base station. In response to the received reasons of the MRO deviation being any of missing too-late handover events, false recognizing too-early handover events, or false recognizing handover to wrong cell events, the target base station may decrease, in step S530, the target base station may decrease the timing threshold $T_{store\_ue\_cntxt}$ for storing user equipment context so as to compensate at least part of the detected MRO deviation.

To sum up, Table. 1 shows how these timing thresholds could be adjusted for different deduced reasons for the MRO deviation.

| Comparison Result | Deviation reason | Solutions At source BS | At target BS |
|---|---|---|---|
| the HOM fluctuation center is smaller than the HOM value with the smallest HO failure ratio | Missing too-early HO events, missing HO to wrong cell events, or false recognizing too-late HO events | Increasing $T_{too\_early\_detect}$ decreasing $T_{too\_late\_detect}$ | Increasing $T_{store\_ue\_cntxt}$ |
| the HOM fluctuation center is larger than the HOM value with the smallest HO failure ratio | Missing too-late HO events, false recognizing too-early HO events, or false recognizing HO to wrong cell events | Increasing $T_{too\_late\_detect}$ decreasing $T_{too\_early\_detect}$ | decreasing $T_{store\_ue\_cntxt}$ |

Figure 1:
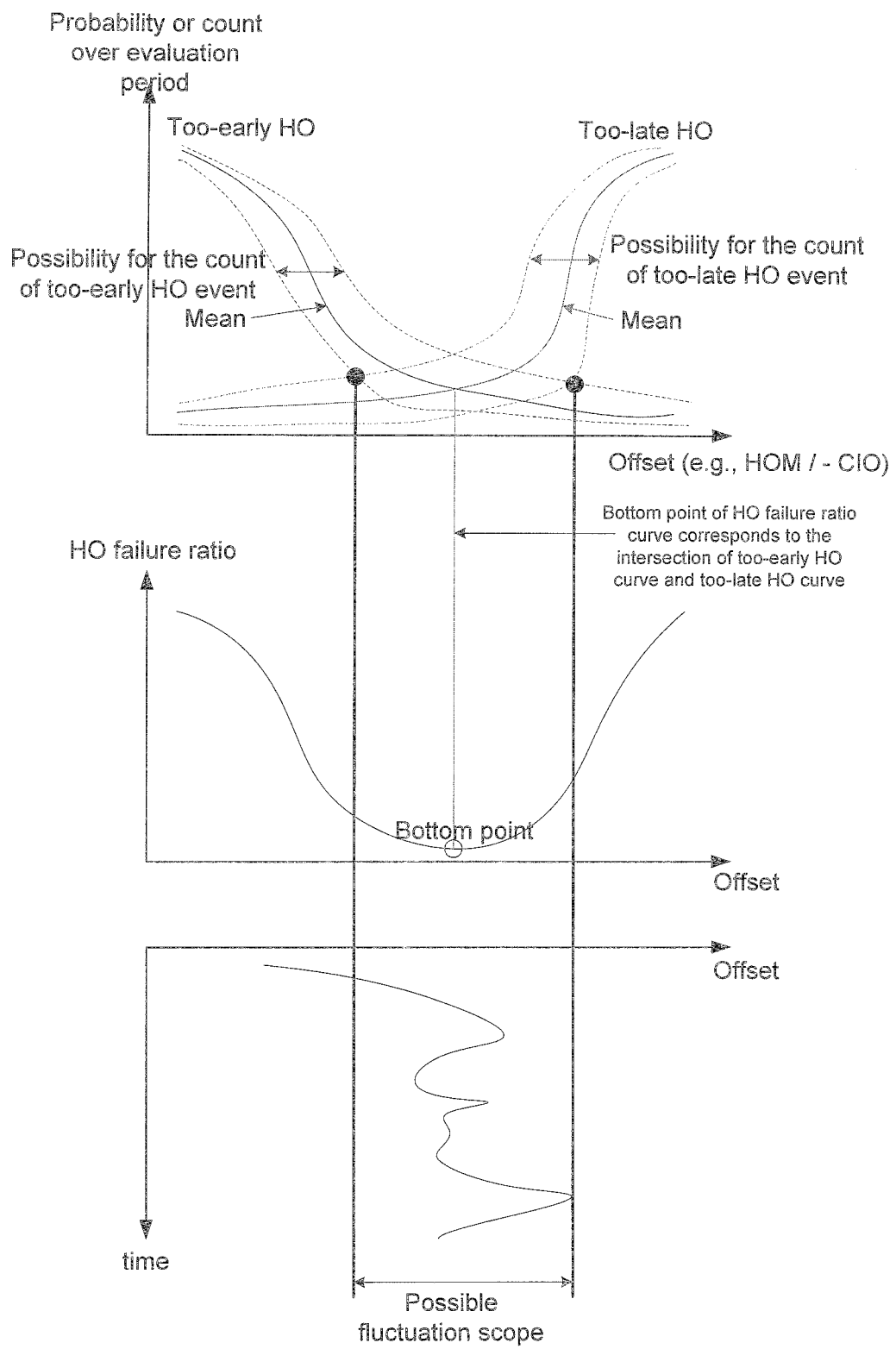
FIG. 1 schematically illustrates the relation between MRO function and handover failure ratio.

As shown in FIG. 1, one or more of the timing thresholds need to be adjusted incrementally or degressively to compensate the detected MRO deviation. Those skilled in the art may employ various customary technical means to perform specific adjustment as desired. For example, adjustment steps, adjustment period may be predefined for the step of increasing and/or decreasing a timing threshold. When the MRO deviation is detected within an adjustment period, then the corresponding timing threshold(s) can be increased/decreased by the predefined adjustment steps. Such adjustment procedure may be performed recursively until the detected MRO deviation is compensated. Those skilled in the art may further define any advanced criteria/rules for the adjustment procedure to make the MRO deviation calibration meet practical requirements. Indeed, how to design a practical and exercisable adjustment procedure for calibrating the detected MRO deviation belongs to implementation issues in the art and will not be set forth in details herein.

In addition, those skilled in the art may perform the compensation of MRO deviation in a direct or indirect way by adjusting any other suitable MRO parameters and/or MRO algorithms.

For example, according to an embodiment of the present invention, the source base station may alternatively adjust weights and other thresholds which are used in MRO function to evaluate and trigger the HOM variation.

According to another embodiment of the present invention, the source base station may alternatively adjust Random Access Channel (RACH) parameters so that the MRO events can satisfy the existing MRO rule, by which the MRO deviation can be indirectly compensated.

Returning to FIG. 4, the source base station executes (S430) the MRO function that has been calibrated according to an embodiment of the present invention.

The processing proceeds with step S410 to detect whether there is any further MRO deviation.

The processing of MRO function calibration according to the various embodiments of the present invention has been depicted in detail with reference to FIGS. 4 and 5.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps; while the sequence of steps may be different from the depiction. For example, in some embodiments, the above one or more optional steps may be omitted. Specific embodiment of each step may be different from the depiction. All these variations fall within the spirit and scope of the present invention.

Figure 6:
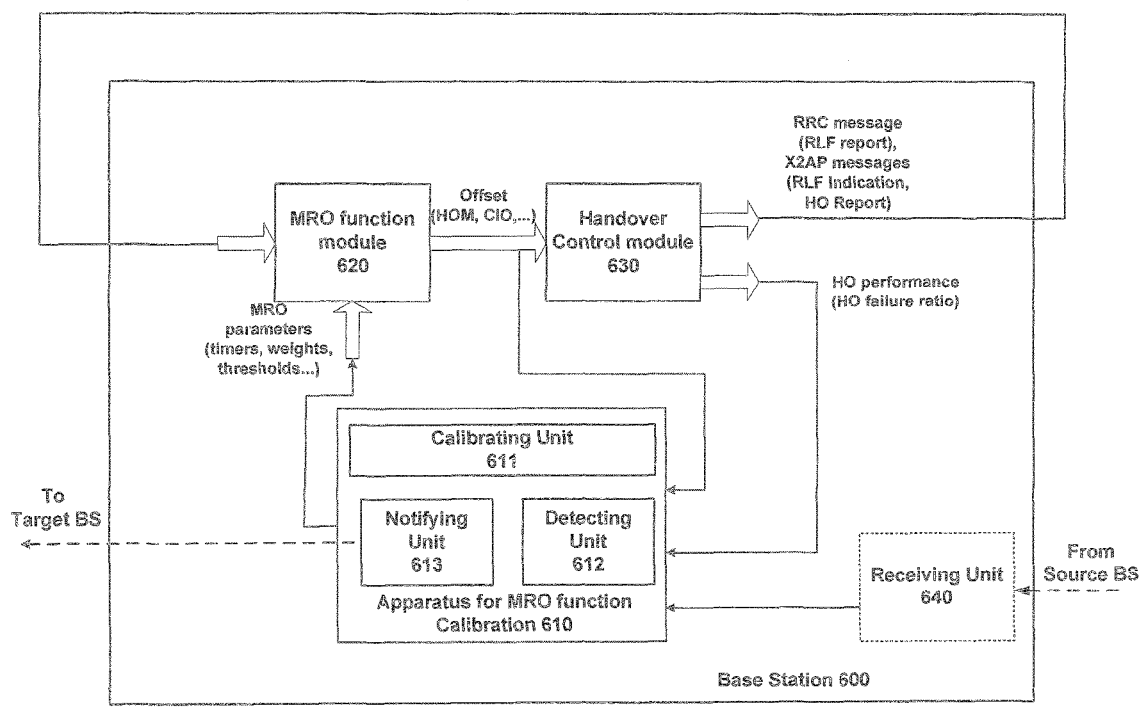
FIG. 6 schematically illustrates a block diagram of a base station according to an embodiment of the present invention.

FIG. 6 schematically illustrates a block diagram of a source base station according to an embodiment of the present invention.

As shown in FIG. 6, a base station 600 may comprise an apparatus for a MRO function calibration 610, a MRO function module 620 and a handover control module 630.

The base station 600 may serve one or more cells and may be capable of acting as a source base station or a target base station, or even both (e.g., in the case that the source cell and target cell belonging to the same base station 600) during inter-cell handover.

It is understood that in the base station 600, the MRO function module 620 and the handover control module 630 are legacy modules, which may operate in a way well known in the prior art, for example, in accordance with 3GPP specification TS36.300 v10.6.0 and 3GPP specification TS36.902 v9.3.1. The MRO function module 620 may receive emerging RRC messages and X2AP messages, and deliver the determined handover parameters, such as the offset parameter indicative of a border of a cell-relation like HOM, CIO etc., to the handover control module 630, while the handover control module 630 may receive the handover parameters, and deliver the monitored RRC messages and X2AP messages to the MRO function module 620. The MRO parameters, such as the timing thresholds used in event detection, may be initially configured and kept substantially constant in the MRO function module 620.

The apparatus for MRO function calibration 610 may obtain the handover parameter such as the offset parameters indicative of a border of a cell-relation like HOM, CIO etc. from the MRO function module 620 and the handover failure ratio from the handover control module 630, and deliver the updated MRO parameters to MRO function module so as to compensate MRO deviation. The apparatus for MRO function calibration 610 may be designed to obey the legacy rule of MRO and handover control, and hence is perfectly compatible with the legacy MRO function and consumes acceptable complexity.

According to an embodiment of the present invention, the apparatus for MRO function calibration 610 may comprise a detecting unit 612 and a calibrating unit 611. The detecting unit 612 can be configured to detect MRO deviation by comparing a fluctuation center of an offset parameter indicative of a border of a cell-relation and a value of the offset parameter enabling handover failure ratio to be minimized. The calibrating unit 611 can be configured to calibrate the MRO function by compensating the detected MRO deviation.

The apparatus for MRO function calibration 610 may further comprises a calculating unit (not shown in the FIG. 6). The calculating unit can be configured to calculate the fluctuation center of the offset parameter in real time by monitoring an actual usage trace of the offset parameter obtained from the MRO function module 620. The calculating unit may be also configured to determine the value of the offset parameter enabling the handover failure ratio to be minimized by counting said handover failure ratio at each enumerated value of the offset parameter.

According to an embodiment of the present invention, the detecting unit 612 can be further configured to deduce reasons of the MRO deviation based on whether the fluctuation center of the offset parameter indicative of a border of a cell-relation is smaller or larger than the value of the offset parameter enabling said handover failure ratio to be minimized. In an embodiment of the present invention, if the fluctuation center of the offset parameter indicative of a border of a cell-relation is smaller than the value of the offset parameter enabling said handover failure ratio to be minimized, the detecting unit 612 may deduce that the reasons of the MRO deviation comprise any of missing too-early handover events, missing handover to wrong cell events, or false recognizing too-late handover events. Otherwise, if said fluctuation center of said offset parameter indicative of a border of a cell-relation is larger than said value of said offset parameter enabling said handover failure ratio to be minimized, the detecting unit 612 may deduce that the reasons of the MRO deviation comprise any of missing too-late handover events, false recognizing too-early handover events, or false recognizing handover to wrong cell events.

The calibrating unit 611 is configured to adjust MRO parameters and/or MRO algorithms according to the reasons of the MRO deviation deduced by the detecting unit 612.

According to an embodiment of the present invention, the calibrating unit 611 is configured to adjust MRO parameters. In response to the reasons of the MRO deviation being deduced by the detecting unit 612 as any of missing too-early handover events, missing handover to wrong cell events, or false recognizing too-late handover events, the calibrating unit 611 can be configured to increase a timing threshold for judging whether a too-early handover event is detected, and/or decreasing a timing threshold for judging whether a too-late handover event is detected at said source base station of handover.

Additionally or alternatively, the apparatus for MRO function calibration 610 may further comprise a notifying unit 613. In response to the reasons of the MRO deviation being deduced by the detecting unit 612 as any of missing too-early handover events, missing handover to wrong cell events, or false recognizing too-late handover events, the notifying unit 613 may be configured to notify a target base station of handover of the reasons of the MRO deviation, so as to cause a target base station of handover to increase a timing threshold for storing user equipment context. In an implementation of the present invention, the notifying unit 613 may send to the target base station of handover a message according to LTE X2 Application Protocol to indicate the deduced reasons of the MRO deviation.

In response to the reasons of the MRO deviation being deduced by the detecting unit 612 as any of missing too-late handover events, false recognizing too-early handover events, or false recognizing handover to wrong cell events, the calibrating unit 611 is configured to decrease the timing threshold for judging whether a too-early handover event is detected and/or increasing the timing threshold for judging whether a too-late handover event is detected at the source base station of handover.

Additionally or alternatively, in response to the reasons of the MRO deviation being deduced by the detecting unit 612 as any of missing too-late handover events, false recognizing too-early handover events, or false recognizing handover to wrong cell events, the notifying unit 613 can be configured to notify a target base station of handover of the reasons of the MRO deviation, so as to cause the target base station of handover to decrease the timing threshold for storing user equipment context. In an implementation of the present invention, the notifying unit 613 may send to the target base station of handover a message according to LTE X2 Application Protocol to indicate the deduced reasons of the MRO deviation.

According to an embodiment of the present invention, the base station 600 may further comprise a receiving unit 640. When the base station 600 is acting as a target base station in a handover procedure, it is possible that the receiving unit 640 receives a massage from the source base station of the handover procedure, indicative of the reasons of MRO deviation deduced by the source base station. In this regard, in response to the received reasons of the MRO deviation being any of missing too-early handover events, missing handover to wrong cell events, or false recognizing too-late handover events, the calibrating unit 611 of the apparatus for MRO function calibration 610 may increase a timing threshold for storing user equipment context so as to compensate at least part of the determined MRO deviation. Otherwise, in response to the received reasons of the MRO deviation being any of missing too-late handover events, false recognizing too-early handover events, or false recognizing handover to wrong cell events, the calibrating unit 611 of the apparatus for MRO function calibration 610 may decrease the timing threshold for storing user equipment context so as to compensate at least part of the MRO deviation.

Here, the base station 600 as illustrated in FIG. 6 is described with the modules or components which are most relevant to the embodiments of the present invention. However, those skilled in the art can appreciate that the base station 600 also comprises other modules and components for performing the functionality of cellular communication, including antennas; transceiver (having a transmitter (TX) and a receiver (RX)); processors such as one or more of general purpose computers, special purpose computers, microprocessors, digital signal processors (DSPs) and processors based on multi-core processor architecture; memory module of any type suitable to the local technical environment and implemented using any suitable data storage technology; etc. Those modules or components are well known in the art and the description thereof is omitted for the purpose of conciseness.

According to one or more embodiments of the present invention, the solution for the calibrating MRO function for inter-cell handover are provided to automatically detect and compensate the MRO deviation, avoiding the inaccuracy and out-date for manual configuration.

Advantageously, the newly introduced functionality of MRO function calibration according to one or more embodiments of the present invention is capable of following the existing MRO standardization and implementation designs. Therefore, it can be utilized in practical systems in a compatible way.

In one or more embodiments of the present invention, compensation is taken only at a source base station. In this regard, no extra X2AP messages are required, and hence no more standardization effort is needed. In yet another one or more embodiments of the present invention, compensation may be additionally or alternatively taken at a neighbor base station, which is acting as a target base station of handover. In this regard, new X2AP messaging is required, which may or may not need to be standardized in 3GPP.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for calibrating mobile robustness optimization for inter-cell handover, comprising:
    detecting mobile robustness optimization deviation by:
        comparing a fluctuation center of an offset parameter indicative of a border of a cell-relation and a value of said offset parameter enabling handover failure ratio to be minimized, wherein said fluctuation center is calculated by a source base station in real time by monitoring an actual usage trace of said offset parameter;
        deducing reasons of said mobile robustness optimization deviation based on whether said fluctuation center is smaller or larger than said value of said offset parameter,
        wherein said reasons comprise any of missing too-early handover events, missing handover to wrong cell events, or false recognizing too-late handover events, if said fluctuation center is smaller than said value of said offset parameter, and
        wherein said reasons comprise any of missing too-late handover events, false recognizing too-early handover events, or false recognizing handover to wrong cell events, if said fluctuation center is larger than said value of said offset parameter; and
    calibrating said mobile robustness optimization function by compensating the detected mobile robustness optimization deviation.

2. The method according to claim 1, further comprising:
    determining said value of said offset parameter enabling said handover failure ratio to be minimized by counting said handover failure ratio at each enumerated value of said offset parameter.

3. The method according to claim 1, wherein the step of calibrating said mobile robustness optimization function comprising:
    adjusting mobile robustness optimization parameters and/or mobile robustness optimization algorithms according to said reasons of said mobile robustness optimization deviation.

4. The method according to claim 3, wherein the step of adjusting said mobile robustness optimization parameters comprising:
    if said reasons of said mobile robustness optimization deviation is deduced as any of missing too-early handover events, missing handover to wrong cell events, or false recognizing too-late handover events, then increasing a first timing threshold for judging whether a too- early handover event is detected, and/or decreasing a second timing threshold for judging whether a too-late handover event is detected at said source base station of handover.

5. The method according to claim 3, wherein the step of adjusting said mobile robustness optimization parameters comprising:
    if said reasons of said mobile robustness optimization deviation is deduced as any of missing too-early handover events, missing handover to wrong cell events, or false recognizing too-late handover events, then notifying a target base station of handover of said reasons of said mobile robustness optimization deviation so as to cause said target base station of handover to increase a third timing threshold for storing user equipment context.

6. The method according to claim 3, wherein the step of adjusting said mobile robustness optimization parameters comprising:
    if said reasons of said mobile robustness optimization deviation is deduced as any of missing too-late handover events, false recognizing too-early handover events, or false recognizing handover to wrong cell events, then decreasing a first timing threshold for judging whether a too-early handover event is detected and/or increasing a second timing threshold for judging whether a too-late handover event is detected at said source base station of handover.

7. The method according to claim 3, wherein the step of adjusting said mobile robustness optimization parameters comprising:
    if said reasons of said mobile robustness optimization deviation is deduced as any of missing too-late handover events, false recognizing too-early handover events, or false recognizing handover to wrong cell events, then notifying a target base station of handover of said reasons of said mobile robustness optimization deviation so as to cause said target base station of handover to decrease a third timing threshold for storing user equipment context.

8. The method according to claim 5, wherein the step of notifying said target base station of handover comprising:
sending to said target base station of handover a message indicative of said reasons of said mobile robustness optimization deviation according to LTE X2 Application Protocol.

9. A method for calibrating mobile robustness optimization for inter-cell handover, comprising:
receiving from a source base station of handover a message indicative of reasons of mobile robustness optimization deviation, wherein said mobile robustness optimization deviation is detected by said source base station by comparing a fluctuation center of an offset parameter indicative of a border of a cell-relation and a value of said offset parameter enabling handover failure ratio to be minimized, wherein said fluctuation center is calculated by a source base station in real time by monitoring an actual usage trace of said offset parameter; and
calibrating said mobile robustness optimization function by:
adjusting a timing threshold for storing user equipment context based on the received reasons of mobile robustness optimization deviation,
increasing said timing threshold for storing user equipment context, if said reasons of said mobile robustness optimization deviation is any of missing too-early handover events, missing handover to wrong cell events, or false recognizing too-late handover events, and
decreasing said timing threshold for storing user equipment context, if said reasons of said mobile robustness optimization deviation is any of missing too-late handover events, false recognizing too-early handover events, or false recognizing handover to wrong cell events.

10. An apparatus for calibrating mobile robustness optimization function for inter-cell handover, comprising:
calculating unit configured to calculate a fluctuation center of an offset parameter, indicative of a border of a cell-relation, in real time by monitoring an actual usage trace of said offset parameter;
detecting unit configured to detect mobile robustness optimization deviation, wherein said detecting unit is configured to:
compare said fluctuation center of said offset parameter indicative of a border of a cell-relation and a value of said offset parameter enabling handover failure ratio to be minimized to detect mobile robustness optimization deviation;
deduce reasons of said mobile robustness optimization deviation based on whether said fluctuation center is smaller or larger than said value of said offset parameter,
wherein said reasons comprise any of missing too-early handover events, missing handover to wrong cell events, or false recognizing too-late handover events, if said fluctuation center is smaller than said value of said offset parameter, and
wherein said reasons comprise any of missing too-late handover events, false recognizing too-early handover events, or false recognizing handover to wrong cell events, if said fluctuation center is larger than said value of said offset parameter;
calibrating unit configured to calibrate said mobile robustness optimization function by compensating the detected mobile robustness optimization deviation.

11. The apparatus according to claim 10, further comprising:
calculating unit configured to determine said value of said offset parameter enabling said handover failure ratio to be minimized by counting said handover failure ratio at each enumerated value of said offset parameter.

12. An apparatus for calibrating mobile robustness optimization function for inter-cell handover, comprising:
receiving unit configured to receive from a source base station of handover a message indicative of reasons of mobile robustness optimization deviation, wherein said mobile robustness optimization deviation is detected by said source base station by:
comparing a fluctuation center of an offset parameter indicative of a border of a cell-relation and a value of said offset parameter enabling handover failure ratio to be minimized, wherein said fluctuation center is calculated by said source base station in real time by monitoring an actual usage trace of said offset parameter; and
deducing reasons of said mobile robustness optimization deviation based on whether said fluctuation center is smaller or larger than said value of said offset parameter,
wherein said reasons comprise any of missing too-early handover events, missing handover to wrong cell events, or false recognizing too-late handover events, if said fluctuation center is smaller than said value of said offset parameter, and
wherein said reasons comprise any of missing too-late handover events, false recognizing too-early handover events, or false recognizing handover to wrong cell events, if said fluctuation center is larger than said value of said offset parameter; and
calibrating unit configured to calibrate said mobile robustness optimization function by adjusting a timing threshold for storing user equipment context based on the received reasons of mobile robustness optimization deviation.

* * * * *